United States Patent
Yamaguchi et al.

(10) Patent No.: US 8,292,344 B2
(45) Date of Patent: Oct. 23, 2012

(54) MOUNTING STRUCTURE OF GRIP WITH INTEGRATED HANDLE

(75) Inventors: Mamoru Yamaguchi, Toyokawa (JP); Yoshiaki Maesoba, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 94 days.

(21) Appl. No.: 12/900,806

(22) Filed: Oct. 8, 2010

(65) Prior Publication Data

US 2011/0094061 A1    Apr. 28, 2011

(30) Foreign Application Priority Data

Oct. 26, 2009   (JP) .................. 2009-245698

(51) Int. Cl.
*B60N 3/02* (2006.01)
(52) U.S. Cl. .................... 296/1.02; 296/146.7
(58) Field of Classification Search ............. 296/146.7, 296/1.02, 1.08; 16/421
See application file for complete search history.

(56) References Cited

U.S. PATENT DOCUMENTS

| | | | |
|---|---|---|---|
| 6,149,224 A | 11/2000 | Tiberia et al. | |
| 8,113,561 B2 * | 2/2012 | Yamada et al. | 296/1.02 |
| 2009/0144940 A1 * | 6/2009 | Yamada et al. | 16/412 |
| 2011/0304172 A1 * | 12/2011 | Cho | 296/146.7 |

FOREIGN PATENT DOCUMENTS

| | | | |
|---|---|---|---|
| CN | 2839474 Y | | 11/2006 |
| JP | 07304370 A | * | 11/1995 |
| JP | 9-076807 | | 3/1997 |
| JP | 09076807 A | * | 3/1997 |
| JP | H09-249061 A | | 9/1997 |
| JP | H11-139160 A | | 5/1999 |
| JP | 2009-137409 A | | 6/2009 |
| KR | 2003008908 A | * | 1/2003 |

OTHER PUBLICATIONS

China Office action, mail date is Jul. 3, 2012.

* cited by examiner

*Primary Examiner* — H Gutman
(74) *Attorney, Agent, or Firm* — Greenblum & Bernstein, P.L.C.

(57) ABSTRACT

A mounting structure of a grip with integrated handle to a door panel includes the grip, a door trim to which the grip is mounted, a bracket, an overlapping portion and a handle fastening portion. The grip includes a grip portion and a handle portion that are integrally formed. The bracket is arranged so as to extend from an end of the grip portion to the handle portion. The overlapping portion includes a part of the grip, a part of the door trim and a part of the bracket held together so as to overlap with one another. The handle fastening portion is provided for fastening the handle portion to the door panel and with which the bracket is to be fixed to the door panel.

6 Claims, 5 Drawing Sheets

# US 8,292,344 B2

MOUNTING STRUCTURE OF GRIP WITH INTEGRATED HANDLE

CROSS REFERENCE TO RELATED APPLICATION

This application claims priority from Japanese Patent Application No. 2009-245698 filed on Oct. 26, 2009. The entire content of this priority application is incorporated herein by reference.

TECHNICAL FIELD

This disclosure is related to a mounting structure of a grip with integrated handle.

BACKGROUND

In known vehicle door trims, in general, door grips and inside panels are separately prepared and mounted to door panels with screws. Recently, door grip structures including integrated-type door covers are developed for design-focused products. In such structures, a grip cover and an inside handle bezel are integrally formed. Examples of such structures are disclosed in Japanese Patent Applications No. H09-249061 and No. H11-139160.

In these examples, a door trim is mounted to a door panel first. Then, an inside handle case is placed over the door trim and directly fixed to the door panel. A grip base is also directly fixed to the door panel. Finally, an integrated-type cover is attached so as to cover the inside handle case and the grip base. The reason why the inside handle case is directly fixed to the door panel is because a relatively large force is applied during handle operation.

In consideration of mounting strength, the inside handle case needs to be fixed to a door panel at one point and ends of the grip base need to be fixed to the door panel at two points. Namely, the three fixing points are required. Furthermore, the door grip and the inside handle cannot be fixed to the door panel before the door trim is mounted to the door panel. Namely, the integrated-type cover needs to be mounted at a customer site and this complicates installation of the door trim at the customer site.

SUMMARY

The present invention was made in view of the foregoing circumstances. An object of the present invention is to provide a simple and strong mounting structure of a grip with integrated handle to a door panel so that door trim installation at a customer site is simplified.

According to the present invention, a mounting structure of a grip with integrated handle to a door panel includes a grip with integrated handle, a door trim to which the grip is mounted, a bracket, an overlapping portion and a handle fastening portion for fastening the handle portion to the door panel. The grip includes a grip portion and a handle portion that are integrally formed such that the handle portion continues from one end of the grip portion. The bracket is arranged so as to extend from an end of the grip portion to the handle portion. The overlapping portion includes a part of the grip, a part of the door trim and a part of the bracket held together so as to overlap with one another. The bracket is to be fixed to the door panel with the handle fastening portion.

Because the end of the grip portion is connected to the handle portion with the bracket, the end of the grip portion does not need to be fastened to the door panel. Therefore, the grip with integrated handle can be fixed to the door panel only by fastening the handle portion to the door panel with the handle fastening portion. Namely, the end of the grip portion and the handle portion do not need to be separately fastened to the door panel. This simplifies the mounting structure of the grip with integrated handle without reducing mounting strength.

Because the parts of the grip, the door trim and the bracket are held together so as to overlap with one another in the overlapping portion, attachment of an integrated-type cover at a customer is not required, which is required in known configurations. Namely, only the attachment of the door trim to the door panel is required at the customer site and this simplifies the installation of the door trim at the customer site.

BRIEF DESCRIPTION OF THE DRAWINGS

Illustrative aspects in accordance with the invention will be described in detail with reference to the following figures wherein.

DETAILED DESCRIPTION

Figure 1:
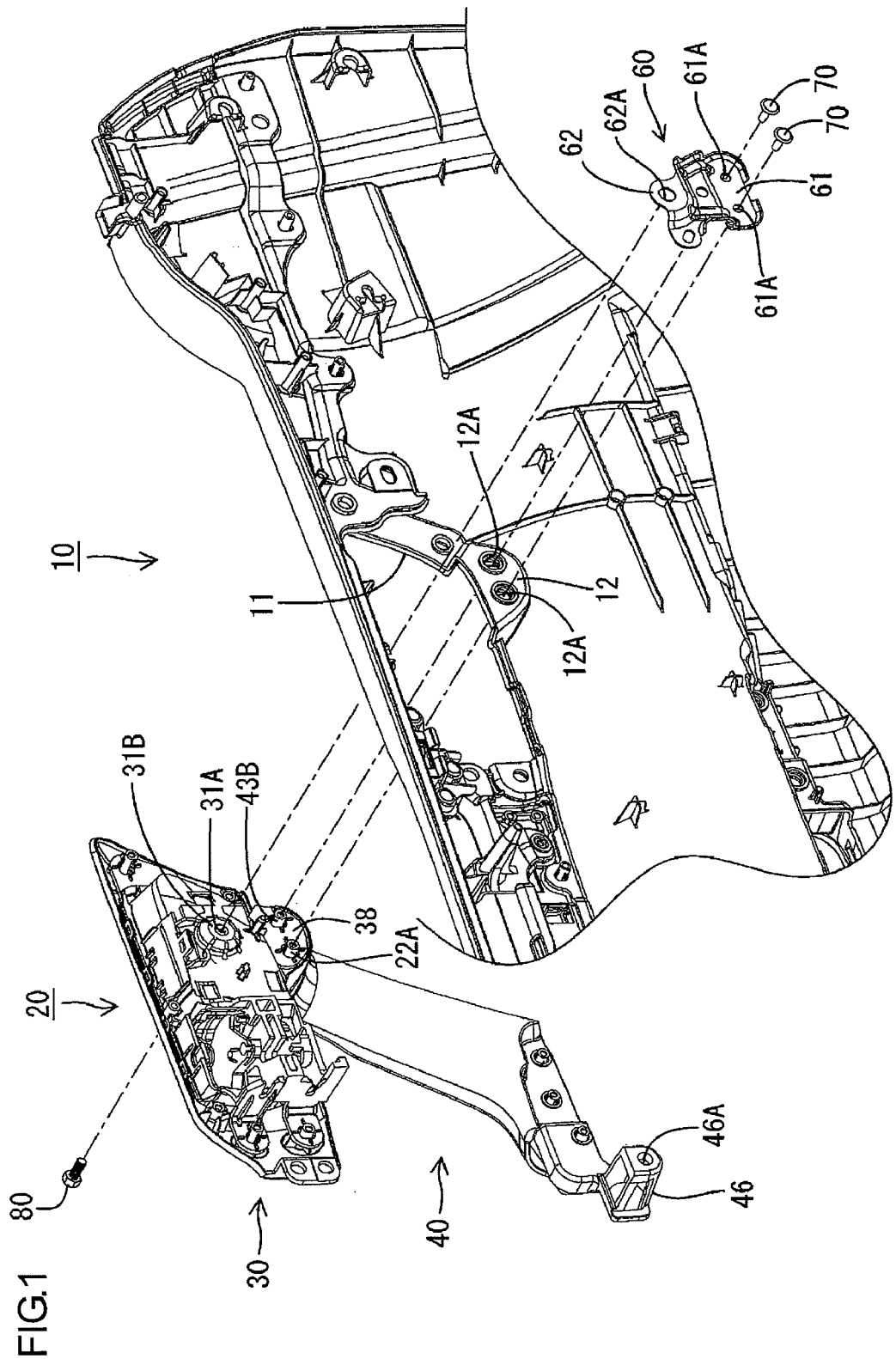
FIG. 1 is a perspective view illustrating a mounting structure of a grip with integrated handle according to one aspect of the invention.
Figure 2:
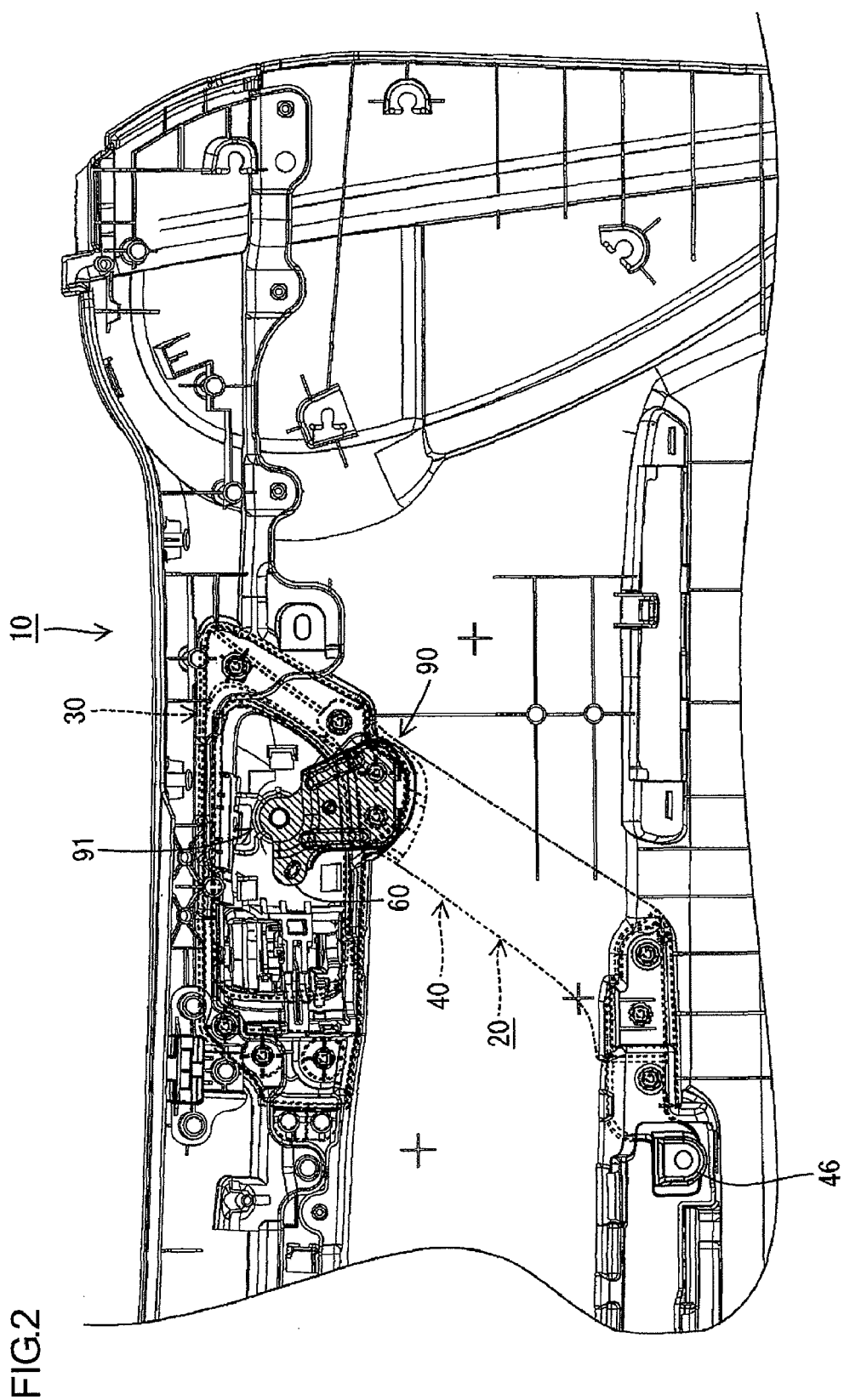
FIG. 2 is a side view illustrating the mounting structure of the grip viewed from the exterior side of a vehicle.

An aspect of the present invention will be explained with reference to FIGS. 1 through 5. As illustrated in FIG. 1, a grip with integrated handle 20 is mounted to an interior-side surface of a door trim 10. The door trim 10 with the grip 20 mounted is delivered to a customer. The door trim 10 is fixed to a door panel 50 at the customer site. The door trim 10 is made of synthetic resin such as polypropylene and wooden material.

Figure 3:
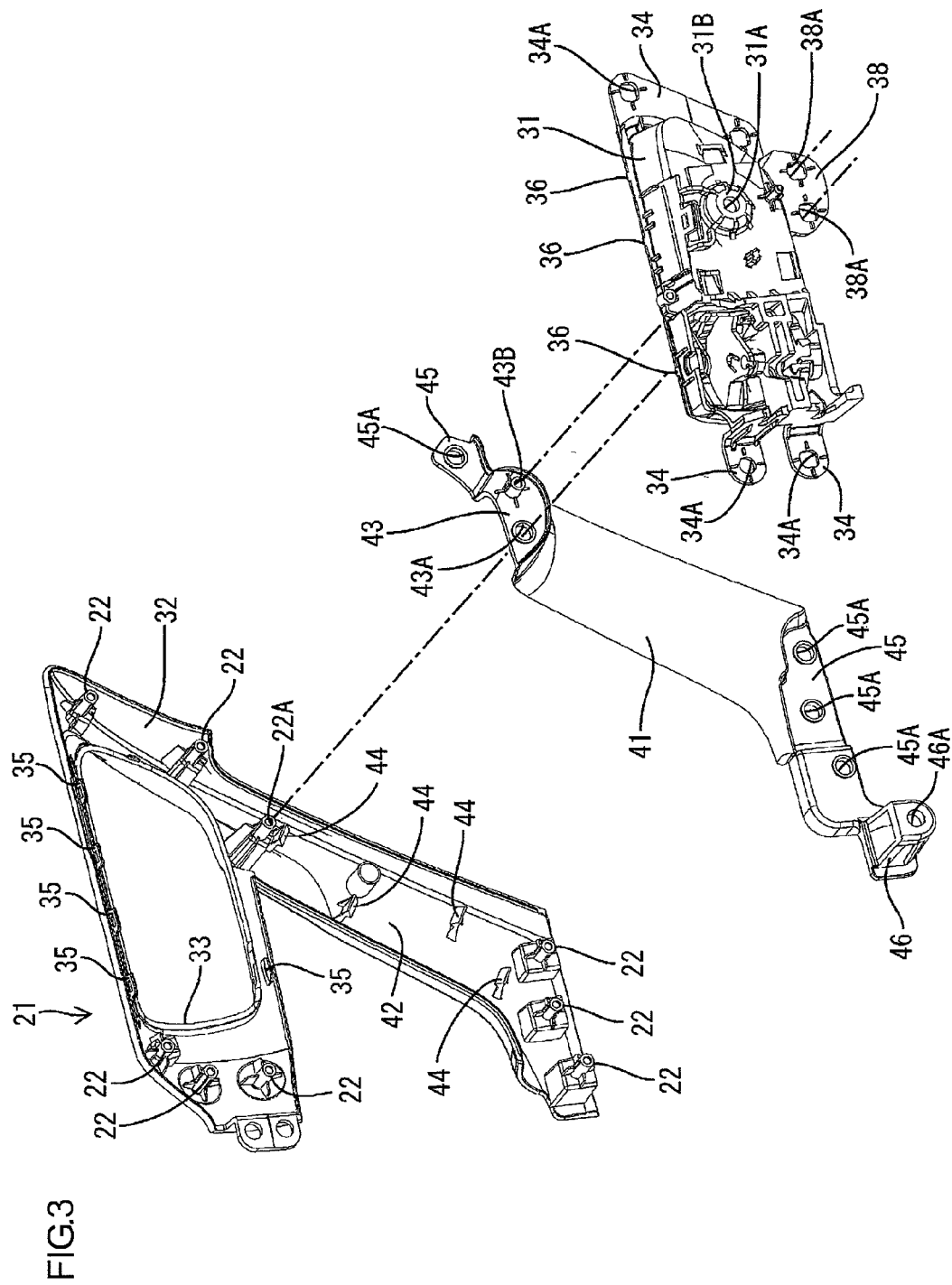
FIG. 3 is an exploded perspective view illustrating the grip.
Figure 4:
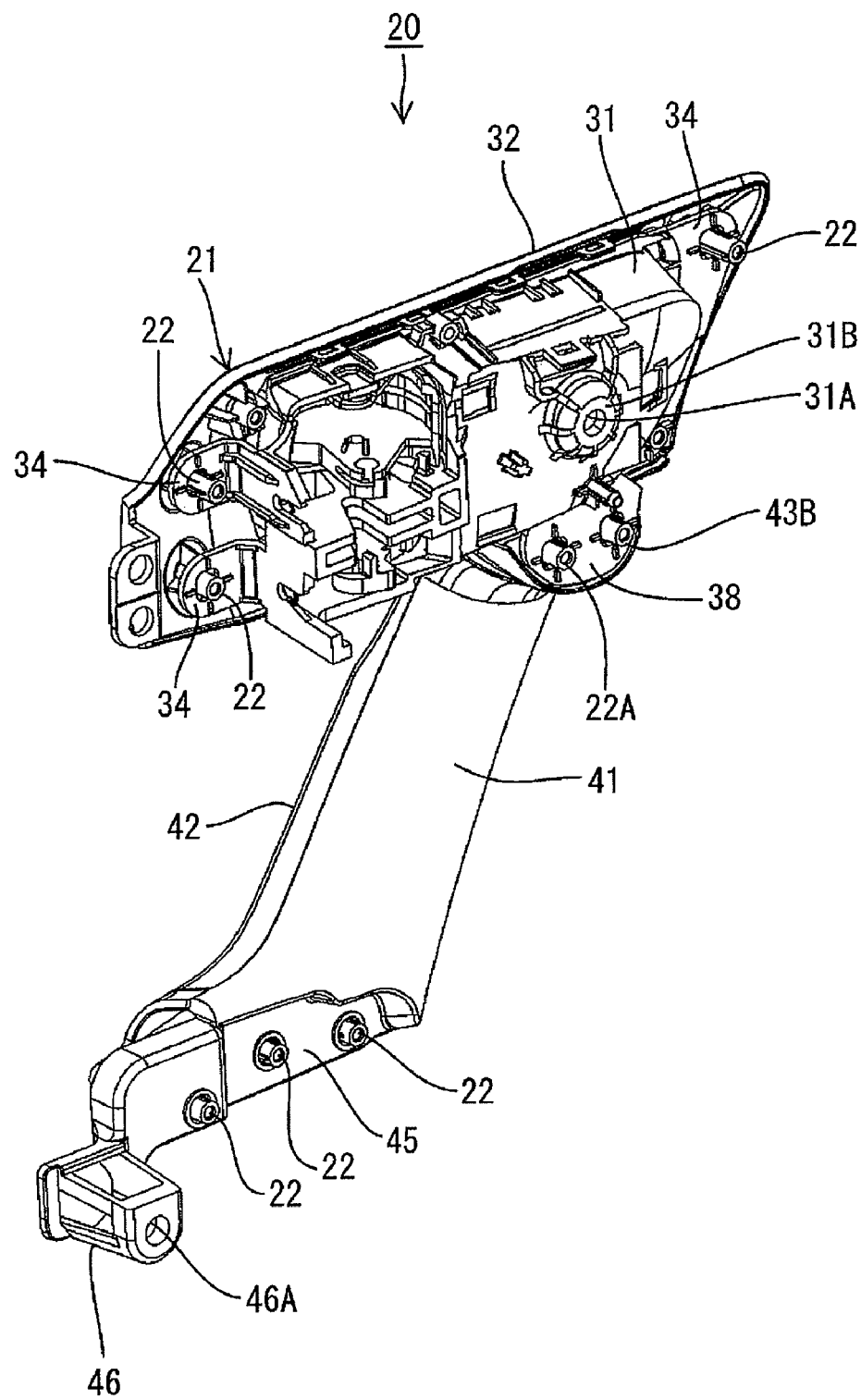
FIG. 4 is a perspective view illustrating the grip with integrated handle.

The grip 20 includes a handle portion 30 and a grip portion 40 that are integrally formed. As illustrated in FIGS. 3 and 4, the handle portion 30 includes an inside handle case 31 and an inside handle bezel 32. The grip portion 40 includes a grip base 41 and a grip cover 42. The inside handle bezel 32 and the grip cover 42 are integrally formed and provided as an integrated-type cover 21. Namely, the grip 20 includes an integrated-type cover 21, the inside handle case 31 and the grip base 41.

The inside handle bezel 32 has a case mounting hole 33 in which the inside handle case 31 is set. The inside handle bezel 32 has lock tabs 35 around the case mounting hole 33. The inside handle case 31 has projections 36 at positions corresponding to the lock tabs 35. The inside handle case 31 is set in the case mounting hole 33 and locked with the projections 36 engaged with the respective lock tabs 35.

The grip cover 42 has fixing pieces 44 along a longitudinal direction of the grip portion 40. The grip base 41 has fixing piece receiving portions (not shown) in locations corresponding to the fixing pieces 44. The grip cover 42 is attached to the grip base 41 and locked with the fixing pieces 44 engaged with the fixing piece receiving portions.

The integrated-type cover 21 has cover fastening pieces 22 on the exterior-side surface. The cover fastening pieces 22 are bosses scattered over an entire area of the integrated-type cover 21. The inside handle case 31 has mounting plate parts 34 in locations corresponding to the cover fastening pieces 22. Each mounting plate part 34 has a through hole 34A through which the corresponding cover fastening piece 22 is passed. The cover fastening piece 22 is passed through the corresponding through hole 34A and fixed to the mounting plate part 34 with ultrasonic welding or with bolts.

A grip overlapping portion 43 is provided at an upper end of the grip base 41. The grip overlapping portion 43 has an insertion hole 43A through which the cover fastening piece 22A is passed. The cover fastening piece 22A is located at the cover fastening piece 22 below the case mounting hole 33. The insertion hole 43A is located below the case mounting hole 33. The cover fastening piece 22A is located in an upper area of the grip cover 42. In the grip overlapping portion 43, a base fastening portion 43B is provided on a side more to the front of the vehicle than the insertion hole 43A. The base fastening piece 43B is a boss similar to the cover fastening piece 22A and projects from the grip overlapping portion 43.

Mounting end portions 45 are provided at upper and lower end of the grip base 41. Insertion holes 45A that are through holes are provided in the mounting end portions 45. The cover fastening pieces 22 are passed through the insertion holes 45A and swaged or fixed with bolts. As a result, the grip base 41 and the grip cover 42 are provided as a single unit.

The insertion holes 45A located in the lower area of the grip base 41 are arranged next to each other in the front-to-rear direction of the vehicle. A fixing piece 46 for fixing the lower end of the grip portion 40 to the door panel 50 with bolts extends from the mounting end portion 45. It is located at the lower end of the grip base 41 and closer to the rear of the vehicle than the mounting end portion 45. The fixing piece 46 projects from the grip base 41 toward the exterior side and has a fixing hole 46A at the distal end.

The inside handle case 31 has a handle overlapping portion 38 in a location corresponding to the grip overlapping portion 43. The handle overlapping portion 38 projects outward from the outer edge of the inside handle case 31 similar to the mounting plate portions 34.

The handle overlapping portion 38 has a pair of fastening holes 38A arranged next to each other in the front-to-rear direction of the vehicle. The base fastening piece 43B is inserted in the front fastening hole 38A located on a side closer to the front of the vehicle. The cover fastening piece 22A is inserted in the rear fastening hole 38A located on a side closer to the rear of the vehicle. The cover fastening piece 22A and the base fastening piece 43B are inserted in the fastening holes 38A, respectively, and the assembly of the grip 20 illustrated in FIG. 4 completes.

As illustrated in FIG. 1, the grip 20 is mounted to the interior-side surface of the door trim 10. The door trim 10 has a handle mounting hole 11 in which handle portion 30 is set. A trim overlapping portion 12 is provided near an outer edge of the handle mounting hole 11. The handle overlapping portion 38 is placed over the trim overlapping portion 12. Namely, the handle overlapping portion 38 is placed so as to overlap an interior side of the trim overlapping portion 12.

A metal plate bracket 60 having a bracket overlapping portion 61 is provided. The bracket overlapping portion 61 is placed so as to overlap the trim overlapping portion 12 on the exterior side thereof. The bracket overlapping portion 61 has a pair of boltholes 61A that are through holes. The trim overlapping portion 12 has a pair of through holes 12A in locations corresponding to the boltholes 61A. Bolts 70 are passed through the respective boltholes 61A, and screwed in the cover fastening piece 22A and the base fastening piece 43B, respectively. As a result, a part of the grip 20, a part of the door trim 10 and a part of the bracket 60 are held together so as to overlap with one another.

A bracket fastening portion 62 extends upward from the upper part of the bracket overlapping portion 61 of the bracket 60. The bracket fastening portion 62 has a bolt through hole 62A. The bolt through hole 62A is provided in a location corresponding to a fixing hole 31A of the inside handle case 31. A bolt 80 is passed through the fixing hole 31A and the bolt through hole 62A, then screwed in the bolt fastening hole 51. As a result, the grip 20, the door trim 10 and the bracket 60 are fastened to the door panel 50, and the grip 20 and the door trim 10 are fixed to the door panel 50.

Figure 5:
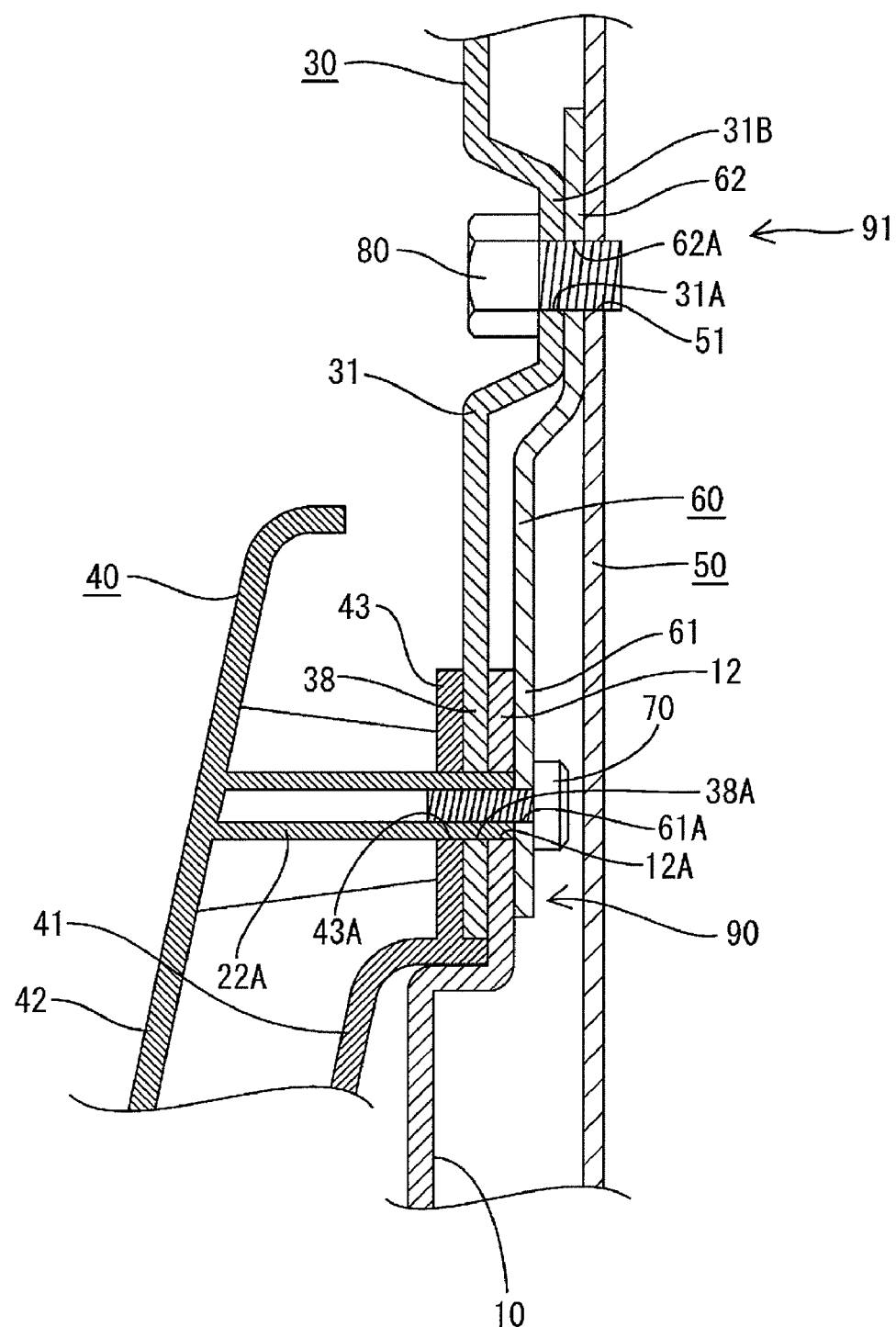
FIG. 5 is a schematic cross-sectional view of the mounting structure of the grip.

As illustrated in FIG. 5, the grip overlapping portion 43, the handle overlapping portion 38, the trim overlapping portion 12 and the bracket overlapping portion 61 are placed in this order between the door trim 10 and the grip 20. They are bound together with the bolt 70 so as to overlap with one another and form an overlapping portion 90. The edge portion 31B around the fixing hole 31A, the bracket fastening portion 62 and the door panel 50 are placed in this order so as to overlap with one another and held together with the bolt 80. The overlapping portion form a handle fastening portion 91.

With this configuration, the upper end portion of the grip portion 40 does not need to be fixed to the door panel 50. Namely, the upper end portion of the grip portion 40 and the handle portion 30 can be fixed to the door panel 50 at one fixing point in the handle fastening portion 91. The upper end portion of the grip portion 40 is fixed to the door panel 50 via the bracket 60 and thus the mounting structure can be simplified without reducing the mounting strength of the grip 20. Furthermore, the door trim 10 with the grip 20 including the integrated-type cover 21 is delivered to a customer site. Namely, when the door trim 10 is mounted at the customer site, the grip 20 is fixed at the same time. The integrated-type cover 21 does not need to be separately mounted to the door trim 10 and thus the mounting of the door trim 10 can be simplified.

The overlapping portion 90 is formed by overlapping the grip overlapping portion 43, the handle overlapping portion 38, the trim overlapping portion 12 and the bracket overlapping portion 61 with one another. The grip portion 40 and the handle portion 30 are connected with the bracket 60 and provided as a single unit. Therefore, the rigidity of the grip 20 improves.

The grip cover 42 and the inside handle bezel 32 are prepared as a single unit and provided as the integrated-type cover 21. Therefore, no connecting line at which the grip cover 42 and the inside handle bezel 32 are connected is present, and thus the appearance thereof improves.

The cover fastening piece 22A and the base fastening piece 43B are fixed together with the overlapping portion 90 to the door panel 50. Therefore, the grip cover 42 and the grip base 41 are fixed to the door panel 50 via the bracket 60. This improves the rigidity of the grip portion 40.

<Other Aspects>

The present invention is not limited to the aspect explained above with reference to the drawings. For example, the following aspects may be included in the present invention.

The handle portion 30 may continue from the upper end of the grip portion 40 toward the front side of the vehicle.

The bracket 60 is not limited to the metal plate. It may be made of other materials having high rigidity.

The inside handle case 31 and the grip base 41 may be integrally formed so that one overlapping portion functions as both handle overlapping portion and grip overlapping portion.

The inside handle bezel 32 and the grip cover 42 may be separately formed.

If the grip portion 40 is formed in a shape that extends in the front-to-rear direction of the vehicle, the cover fastening piece 22A and the base fastening piece 43B may be arranged one above the other. Only the cover fastening portion 22A may be provided as a fastening portion. Alternatively, only the base fastening portion 43B may be provided as a fastening portion.

What is claimed is:

1. A mounting structure of a grip with an integrated handle to a door panel, comprising:
    the grip with the integrated handle including a grip portion and a handle portion that are integrally formed such that a part of the handle portion continues from a part of the grip portion;
    a door trim to which the grip is mounted;
    a bracket separate from the grip arranged to overlap the part of the grip portion and the part of the handle portion;
    an overlapping portion including a part of the grip, a part of the door trim and a part of the bracket held together to overlap with each other; and
    a handle fastening portion for fastening the handle portion to the door panel and with which the bracket is to be fixed to the door panel.

2. The mounting structure of the grip with integrated handle according to claim 1, wherein:
    the grip portion includes a grip cover and a grip base;
    the handle portion includes an inside handle bezel and an inside handle case; and
    the grip includes an integrated-type cover prepared by integrally forming the grip cover and the inside handle bezel.

3. A mounting structure of a grip with an integrated handle to a door panel, comprising:
    the grip with the integrated handle including a grip portion and a handle portion that are integrally formed such that a part of the handle portion continues from a part of the grip portion;
    a door trim to which the grip is mounted;
    a bracket separate from the grip arranged to overlap the part of the grip portion and the part of the handle portion;
    an overlapping portion including a part of the grip, a part of the door trim and a part of the bracket held together to overlap with each other; and
    a handle fastening portion for fastening the handle portion to the door panel and with which the bracket is to be fixed to the door panel, wherein:
    the door trim has a handle mounting hole in which the handle portion is set and a trim overlapping portion in an outer edge area around the handle mounting hole;
    the bracket has a bracket overlapping portion overlapped with a first part of the trim overlapping portion;
    the grip has a second-trim-part overlapping portion that overlaps with a second part of the trim overlapping portion; and
    the second-trim-part overlapping portion includes a handle overlapping portion included in the handle portion and a grip overlapping portion provided at the part of the grip portion, the handle overlapping portion and the grip overlapping portion being overlapped with each other.

4. The mounting structure of the grip with integrated handle according to claim 3, wherein:
    the grip portion includes a grip cover and a grip base;
    the handle portion includes an inside handle bezel and an inside handle case; and
    the grip includes an integrated-type cover prepared by integrally forming the grip cover and the inside handle bezel.

5. The mounting structure of the grip with integrated handle according to claim 4, wherein:
    the overlapping portion has a plurality of fastening portions for holding the grip, the door trim and the bracket to overlap with each other, the fastening portions being positioned next to each other in a front-to-rear direction of a vehicle; and
    the fastening portions include a cover fastening portion positioned in the grip cover and a base fastening portion positioned in the grip base.

6. A mounting structure of a grip with an integrated handle to a door panel, comprising:
    the grip with the integrated handle including a grip portion and a handle portion that are integrally formed such that a part of the handle portion continues from a part of the grip portion;
    a door trim to which the grip is mounted;
    a bracket separate from the grip arranged to overlap the part of the grip portion and the part of the handle portion;
    an overlapping portion including a part of the grip, a part of the door trim and a part of the bracket held together to overlap with each other; and
    a handle fastening portion for fastening the handle portion to the door panel and with which the bracket is to be fixed to the door panel, wherein:
    the grip portion includes a grip cover and a grip base;
    the handle portion includes an inside handle bezel and an inside handle case;
    the grip includes an integrated-type cover prepared by integrally forming the grip cover and the inside handle bezel;
    the overlapping portion has a plurality of fastening portions for holding the grip, the door trim and the bracket to overlap with each other, the fastening portions being positioned next to each other in a front-to-rear direction of a vehicle; and
    the fastening portions include a cover fastening portion positioned in the grip cover and a base fastening portion positioned in the grip base.

* * * * *